United States Patent [19]

Oogi

[11] Patent Number: 5,294,073
[45] Date of Patent: Mar. 15, 1994

[54] TAPE CASSETTE HAVING REEL LOCK MEMBERS WITH RESTRICTING PORTIONS PREVENTING VIBRATION OF REEL FLANGES

[75] Inventor: Takashi Oogi, Miyagi, Japan

[73] Assignee: Sony Corporation, Tokyo, Japan

[21] Appl. No.: 5,907

[22] Filed: Jan. 15, 1993

[30] Foreign Application Priority Data

Jan. 17, 1992 [JP] Japan .................................. 4-025851

[51] Int. Cl.$^5$ .......................................... G11B 23/087
[52] U.S. Cl. ..................................... 242/199; 242/198
[58] Field of Search ........................... 242/197-200; 360/132

[56] References Cited

U.S. PATENT DOCUMENTS 4,513,928  4/1985  Hackett ............................. 242/198

Primary Examiner—Daniel P. Stodola
Assistant Examiner—John Q. Nguyen
Attorney, Agent, or Firm—Lewis H. Eslinger; Jay H. Maioli

[57] ABSTRACT

A tape cassette includes reel hubs which have flanges provided at their peripheral surfaces with engagement portions, and reel lock members, each of which has an engaging portion and is biased so that the engaging portion engages the engagement portion of the flange for preventing rotation of the reel hub. The engaging portion of each reel lock member is provided with a restricting piece for restricting movement of the flange in a direction parallel to the thickness of the flange when the engaging portion is in contact with the engagement portion.

1 Claim, 4 Drawing Sheets 5,294,073

TAPE CASSETTE HAVING REEL LOCK MEMBERS WITH RESTRICTING PORTIONS PREVENTING VIBRATION OF REEL FLANGES

BACKGROUND OF THE INVENTION

1. Field of the Invention

The present invention relates to a tape cassette provided with a reel lock mechanism for unrotatably locking reel hubs carrying a recording medium in a tape form wound therearound.

2. Description of the Related Art

In various tape cassette used for high-density recording, e.g., of video signals or PCM signals, reel lock mechanisms for unrotatably locking reel hubs have been practically used in order to prevent slackening of magnetic tapes when not used, i.e., during storage.

In the tape cassette, e.g., for VHS, Beta-Cam or 8 mm, magnetic tape is wound around reel hubs provided with flanges. The flange is provided at its outer peripheral surface with irregularities forming an engagement portion. The tape cassette is also provided with reel lock members which are movable toward and away from the engagement portions.

FIG. 5 schematically shows a reel lock mechanism, for example, employed in a Beta-Cam VTR cassette, in which magnetic tape 1 is wound around reel hubs 3 and 4 accommodated in a casing 2 which is formed of upper and lower halves. Lower flanges 3a and 4a attached to the reel hubs 3 and 4 are provided at their outer peripheral surfaces with engagement portions 3a1 and 4a1, respectively. Reel lock members 5 and 6 corresponding to the reel hubs are rotatably supported by shaft pins 2a and 2b provided in the casing, respectively. A numeral "7" indicates a lock level for inhibiting opening and closing operations of a lid provided at a front end of the casing. Rotation of the reel lock member 6 is allowed in accordance with the operation of the lock lever 7.

In an ordinary state, i.e., unused state, the reel lock members 5 and 6 are biased by coil springs 8 and 9, so that claws (engaging portions) 5a and 6a provided at their ends may contact and engage with the engagement portions 3a1 and 4a1 to unrotatably lock the reel hubs 3 and 4, respectively.

When the cassette is loaded in a recording and reproducing apparatus, lever portions 5b and 6b located at ends remote from the claws 5a and 6a are biased to rotate the reel lock members 5 and 6, so that the claws 5a and 6a move away from the engagement portions 3a1 and 4a1 to allow rotation of the reel lock hubs 3 and 4.

The reel lock mechanism thus provided in the tape cassette prevents the pay-out of the magnetic tape from the reel hub and thus the slackening thereof, and therefore prevents the damage to the magnetic tape which may be caused by the slack, when an impact is applied to the tape cassette casing in the unused state or the casing is subjected to vibration during transportation. However, certain disadvantages are caused by the reel lock mechanism utilizing the peripheral surfaces of the flanges for the locking operation.

FIG. 6 is an enlarged view showing an engaged state of the claw 5a (6a) of the reel lock member 5 (6) and the engagement portion 3a1 (4a1) of the flange 3a (4a). In this engaged state, although the reel hubs 3 and 4 are rotatably locked as described above, the reel hubs 3 and 4 (and flanges 3a and 4a) are not restricted from moving and vibrating in a direction of the thickness of the cassette casing, i.e., a direction indicated by an arrow T.

When the cassette undergoes the vibration and/or impact, e.g., during transportation, the reel hubs 3 and 4 may vibrate in the direction of the thickness of the casing, as represented by broken lines in FIG. 7.

During the vibration, the reel lock members 5 and 6 are in the locking state, and thus the claws 5a and 6a are in contact with the engagement portions 3a1 and 4a1, so that the claws 5a and 6a rub on the engagement portions 3a1 and 4a1 due to the vibration of the reel hubs 3 and 4, which may generate shaved powder. In general, the flanges 3a and 4a are formed from ABS resin or HIPS (high impact resistance polystylene) or may be formed from mixture of PC (polycarbonate) and ABS resin. Meanwhile, the reel lock members 5 and 6 are formed, e.g., from POM (polyacetal).

The reel hubs 3 and 4 may contact also with the upper and lower halves due to the vibration, so that shaved powder may be generated also between the reel hubs 3 and 4 and the upper and lower halves.

There is a high possibility that the shaved powder generated in the casing 2 adheres to the magnetic tape 1 during the recording and reproducing operations. This causes a significantly disadvantageous dropout of signals to be reproduced. Further, the shaved powder may adhere to a window provided in the casing, which impairs the external appearance of the tape cassette.

SUMMARY OF THE INVENTION

Accordingly, it is an object of the invention to provide a tape cassette, overcoming the above-noted disadvantages, which includes a casing formed of upper and lower halves, a pair of reel hubs which are disposed in the casing, have flanges provided at their peripheral surfaces with engagement portions and carry a recording medium in a tape form wound therearound; and reel lock members, each of which is provided at its tip end with an engaging portion and is biased to engage at the engaging portion with the engagement portion of the flange for preventing rotation of the reel hub, each of the engaging portions of the reel lock members being provided with a restricting piece for restricting movement of the flange in a direction of a thickness of the flange when the engaging portion is in contact with the engagement portion of the flange.

The restricting piece may be formed of a portion, which is provided by partially deforming the engaging portion of the reel lock member. By contacting this portion with a portion of an inner planar surface of the flange when the reel lock member is engaged with the engagement portion at the outer peripheral surface of the flange, the reel hub can be lock so that rotation of the reel hub as well as the vibration thereof in the direction of its thickness can be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
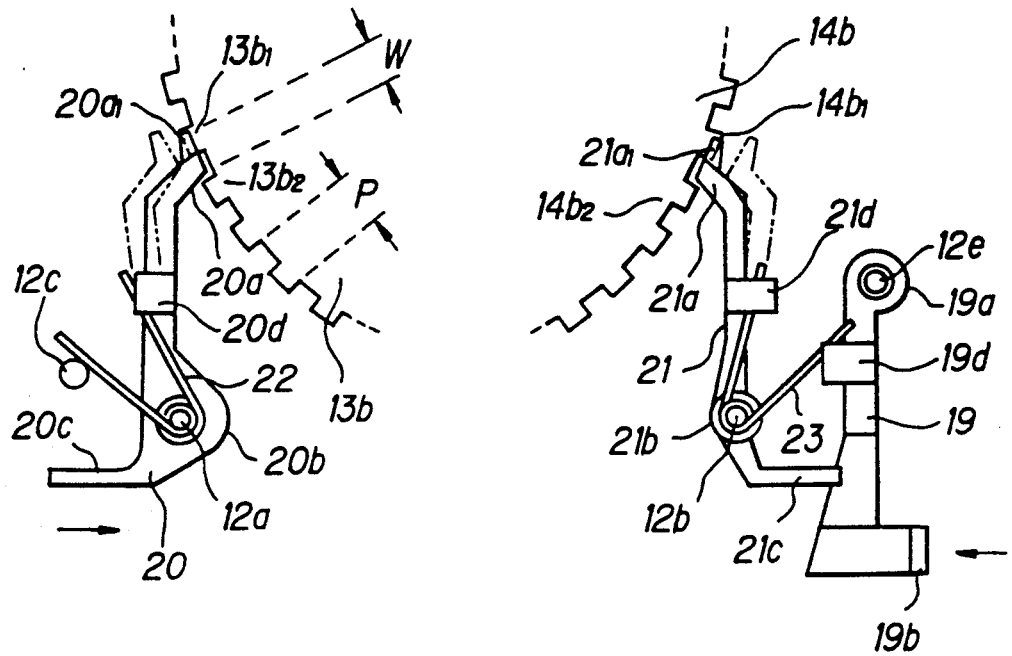
FIG. 1 is a plan showing a reel lock mechanism of an embodiment of the invention.
Figure 2:
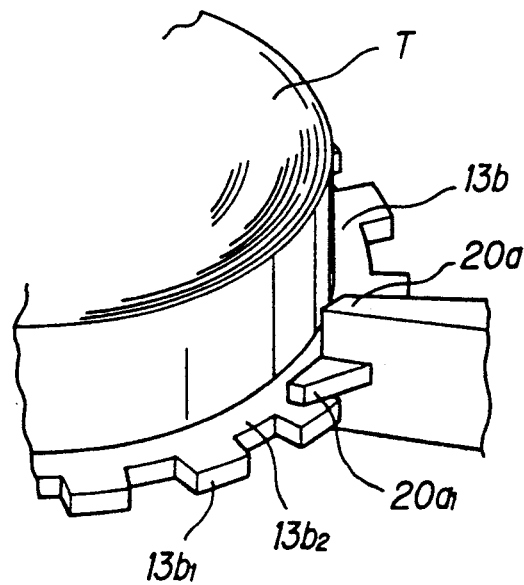
FIG. 2 is a perspective view of a major portion of a reel lock mechanism of an embodiment.
Figure 3:
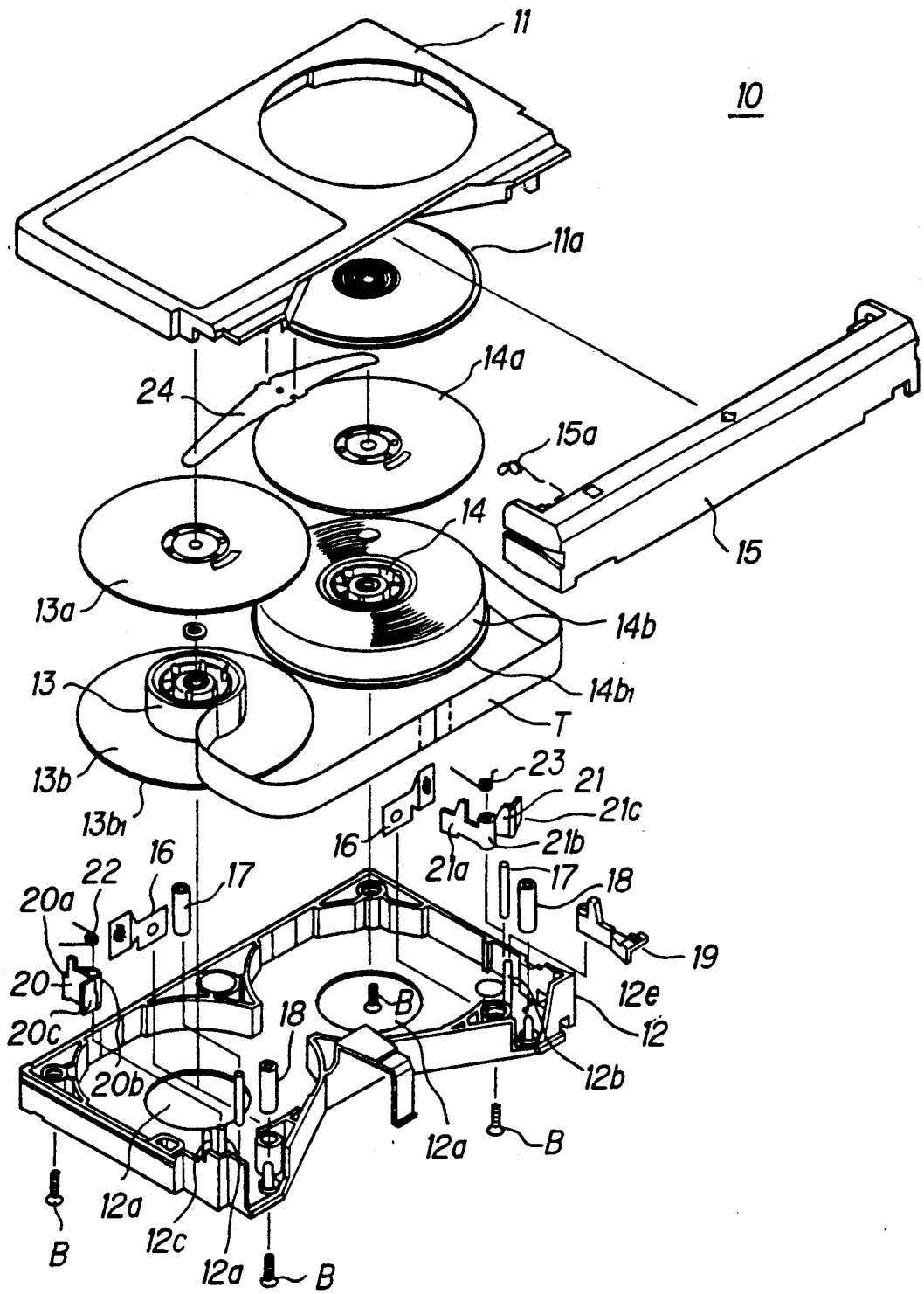
FIG. 3 is an exploded perspective view of a tape cassette of an embodiment.

FIGS. 1-3 show an embodiment in which the invention is applied to a Beta-Cam VTR cassette.

Referring to FIG. 3, a tape cassette 10 of the illustrated embodiment has a casing formed of upper and lower halves 11 and 12. In the casing, there are provided a reel hub 13 at a winding side and a reel hub 14 at a supply side around which magnetic tape T is wound. The casing has a space at its front end which can be closed by a movable lid 15. The lid 15 is attached to the upper half 11 and is biased by a lid spring 15a toward a position at which it closes the opening at the front end of the casing. The upper half 11 is provided with a window 11a, through which a residual amount of the magnetic tape T wound around the reel hub 14 can be viewed.

The reel hubs 13 and 14 are provided at their upper surfaces, which are opposed to the upper half 11, with upper flanges 13a and 14a attached thereto. A reel support spring 24 is disposed on the upper surfaces of the upper flanges 13a and 14a. The reel support spring 24 pushes the reel hubs 13 and 14 toward the lower half 12 with a slight force.

The reel hubs 13 and 14 are provided at their lower surfaces, which are opposed to the lower half 12, with lower flanges 13b and 14b, respectively. The whole outer peripheral surfaces of the lower flanges 13b and 14b have irregularities, which form engagement portions 13b1 and 14b1 for locking the reels.

The reel hubs 13 and 14 of the tape cassette 10 loaded in a recording and reproducing apparatus are driven to rotate by a reel drive shaft, which is inserted through a reel drive shaft inserting hole 12a formed in the lower half 12.

Numerals "16" indicate tape pads. Numerals "17" and "18" indicate a guide roller and a guide pin, respectively. These members define a tape path.

A numeral "19" indicates a lock lever, a numeral "20" indicates a reel lock member corresponding to the reel hub 13, and a numeral "21" indicates a reel lock member corresponding to the reel hub 14. The reel lock mechanism formed of these members is shown on an enlarged scale in FIG. 1.

The reel lock member 20 is rotatably supported by a shaft pin 12a, which is provided at the lower half 12 and is inserted into a cylindrical portion 20a. The other reel lock member 21 is rotatably supported by a shaft pin 12b, which is provided at the lower half 12 and is inserted into the cylindrical portion 21b.

The reel lock members 20 and 21 are biased by coil springs 22 and 23 to rotate and contact with the flanges 13b and 14b, so that claws 20a and 21a formed at their tip ends may engage with the engagement portions 13b1 and 14b1 of the flanges 13b and 14b, respectively.

More specifically, the coil spring 22 has straightly extending opposite end portions, which are engaged with a spring engaging pin 12c provided at the lower half 12 and a spring holder 20d provided at the reel lock member 20. The coil spring 22 held in this manner usually serves to bias the reel lock member 20 to the reel lock position and thereby to prevent the rotation of the reel hub 13.

Meanwhile, the coil spring 23 has straightly extending opposite end portions, which are engaged with a spring holder 19d provided at the lock lever 19 and a spring holder 21d provided at the reel lock member 21. The coil spring 23 held in this manner usually serves to bias the reel lock member 21 to the reel lock position and thereby to prevent the rotation of the reel hub 14.

The lock lever 19 is rotatable owing to the fact that a shaft pin 12e provided at the lower half 12 is inserted into a cylindrical portion 19a. The recording and reproducing apparatus has a lock releasing mechanism, which can be operated to push the lever portion 19b in a sideward direction perpendicular to a side surface of the casing for releasing the locked state of the lid 15 and pushing the lever portion 21c of the reel lock member 21. Thereby, the reel lock member 21 is rotated against a biasing force of the coil spring 23, so that the claw 21a moves away from the engagement portion 14b1, as represented by imaginary line in FIG. 2.

Likewise, the lever portion 20c of the reel lock member 20 can be pushed in the sideward direction by the lock releasing mechanism in the recording and reproducing apparatus. Thereby, the reel lock member 20 is rotated against a biasing force of the coil spring 22, so that the claw 20a moves away from the engagement portion 13b1, as represented by imaginary line in FIG. 2.

The rotation of the reel hubs 13 and 14 are allowed by the movement of the claws 20a and 21a away from the engagement portions 13b1 and 14b1.

In an assembly operation of the tape cassette, the members shown in FIG. 3 are disposed in the upper and lower halves 11 and 12 as shown therein, and thereafter, the upper and lower halves 11 and 12 are fixed together by screws B.

In the tape cassette 10 of the illustrated embodiment, the claws 20a and 21a of the reel lock members 20 and 21 are provided with restricting pieces 20a1 and 21a1, as shown in FIG. 1. The restricting piece 20a1 of the reel lock member 20, which is shown on an enlarged scale in FIG. 21, extends from a side surface of the claw 20a to such an extent that it is substantially in contact with an upper surface 13b2 of the irregular engagement portion 13b1 when the claw 20a is in engagement with the engagement portion 13b1. The restricting portion 21a1 of the reel lock member 21 has a similar structure, and thus will not be detailed hereinafter.

The restricting piece 20a1 is located on the upper surface of a convex portion adjacent to a concave portion of the engagement portion 13b1 with which the claw 20a engages. For this purpose, a width W from the tip end of the claw 20a to the tip end of the restricting piece 20a1 is determined to be substantially equal to a pitch P of the irregularities of the engagement portion 13b1 (see FIG. 1). The width W is required only to have a relationship of W>(P/2).

Figure 7:
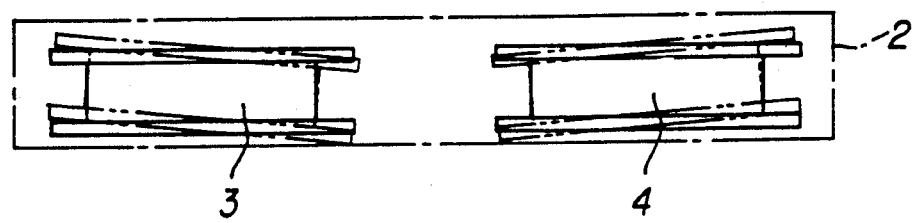
FIG. 7 is a view showing movement of a reel hub in a tape cassette.

The vibration of the flanges 13b and 14b in the direction of the thickness of the casing is restricted owing to the fact that the restricting pieces 20a1 and 21a1 substantially contact the upper surfaces 13b2 and 14b2 of the engagement portions 13b1 and 14b1 of the flanges 13b and 14b. Thus, the reel hubs 13 and 14 which are integral with the flanges 13b and 14b are prevented from rotating, and also the vibration thereof in the direction of the thickness, which is shown in FIG. 7, is prevented.

Therefore, the flanges 13b and 14b do not slide on the claws 20a and 21a, and thus shaved powder is not formed. Naturally, the reel hubs 13 and 14 do not contact the upper and lower halves 11 and 12, and thus the shaved powder does not form therebetween. Since the shaved powder does not form, dropout, which may be caused by the shaved powder, does not occur.

It is preferable that the restricting pieces 20a1 and 21a1 extending toward the reel shafts do not protrude beyond the bottoms of the irregular engagement portions 13b1 and 14b1. However, if there are sufficient margins between the maximum diameter of the wound magnetic tape T and the diameter of the flanges, they may protrude beyond the bottoms.

Figure 4:
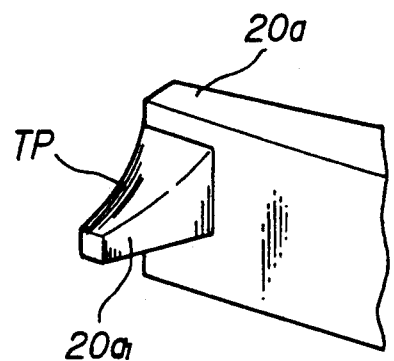
FIG. 4 is a perspective view of a major portion of a reel lock mechanism of another embodiment.
Figure 5:
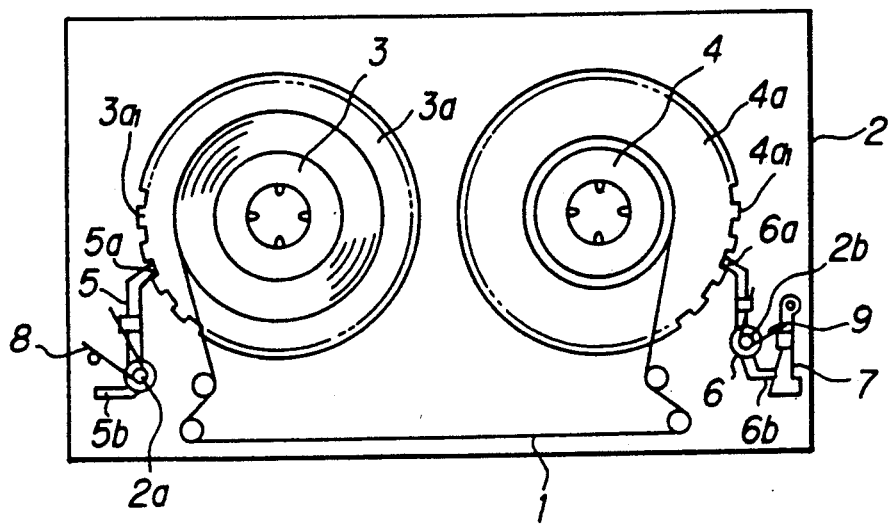
FIG. 5 shows a reel lock mechanism.
Figure 6:
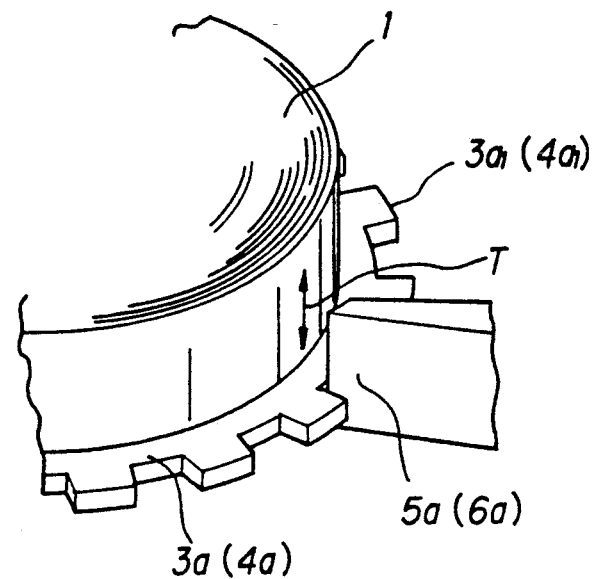
FIG. 6 is a perspective view of a major portion of a reel lock mechanism in the prior art.

FIG. 4 shows a configuration of the restricting piece 20a1 of another embodiment. The restricting piece 21a1 (not shown in FIG. 4) has the same configuration as the piece 20a1. The restricting piece 20a1 has a tapered or inclined upper surface TP. Owing to this configuration, the flange 13b can be rapidly restored to an appropriate position even if the flange 13 moves over the upper surface of the restricting piece 20a1 due to a very large impact applied against the tape cassette or failure in an operation of the reel lock mechanism.

The invention is not restricted to the tape cassette of the illustrated embodiment, and can be applied to tape cassettes of any type including reel lock mechanisms in which the reel lock members contact the engagement portions in the flanges of the reel hubs for locking the reels.

The configuration of the restricting piece, structures of the reel lock mechanism and others can be modified without departing from the spirit of the invention.

According to the tape cassette of the invention, as described hereinabove, the engaging portion of the reel lock member is provided with the restricting piece for restricting the flange, which is in contact with the engagement portion, from moving in the direction of the thickness, so that the reel hub does not move and vibrate in the direction of the thickness of the casing even if it receives the impact and/or vibration. Therefore, generation of the shaved powder, which may be caused by the rubbing of the reel hub and flange on the reel lock member and/or inner surface of the casing, can be prevented, and thus adhesion thereof to the tape and window, which may impair both the recording and reproducing performance and the appearance, can be prevented.

What is claimed is:

1. A tape cassette comprising:
a casing formed of upper and lower parts;
a pair of reel hubs which are disposed in the casing and rotatable about respective axes, having flanges provided at their radially outer peripheral surfaces with engagement portions, and carry a recording tape wound therearound; and
reel lock members, each of which is provided at its tip end with an engaging portion and is biased towards the axis of the corresponding reel hub to engage at the engaging portion with the engagement portion of the corresponding flange for preventing rotation of the corresponding reel hub, each of the engaging portions of the reel lock members being provided with a restricting piece for restricting movement of the flange in a direction parallel to the thickness of the flange when the engaging portion is in contact with the engagement portion of the flange.

* * * * *